United States Patent [19]

Riley

[11] 4,411,574
[45] Oct. 25, 1983

[54] EGG TRANSFER HEAD

[75] Inventor: Douglas E. Riley, Canton, Mich.

[73] Assignee: Diamond Automations, Inc., Framington, Mich.

[21] Appl. No.: 282,754

[22] Filed: Jul. 13, 1981

[51] Int. Cl.³ .............................................. B65G 59/04
[52] U.S. Cl. ..................... 414/121; 198/432; 198/434; 294/65; 294/87 A; 414/416; 414/917
[58] Field of Search ............... 294/64 R, 65, 87 A; 198/418, 434, 432; 414/121, 416, 736, 737, 414/744 B, 752, 34, 917

[56] References Cited

U.S. PATENT DOCUMENTS

| | | | |
|---|---|---|---|
| 2,903,290 | 9/1959 | Morris et al. | 294/87 A |
| 3,230,001 | 1/1966 | Hirt | 294/64 R |
| 3,506,140 | 4/1970 | Koch et al. | 214/1 |
| 3,542,224 | 11/1970 | Warren | 214/309 |
| 3,542,412 | 11/1970 | Koch et al. | 414/737 X |
| 3,792,784 | 2/1974 | Mosterd | 214/6 H |
| 3,805,943 | 4/1974 | Warren | 198/20 R |
| 3,920,128 | 11/1975 | Baker | 241/1 BV |
| 3,929,234 | 1/1975 | Warren | 241/1 BV |
| 3,937,167 | 2/1976 | Warren | 214/152 |
| 4,079,845 | 3/1978 | Warren | 214/8.5 D |
| 4,164,296 | 8/1979 | Trees | 414/416 |
| 4,293,272 | 10/1981 | Jellema | 414/121 X |

Primary Examiner—Robert J. Spar
Assistant Examiner—Ken Muncy
Attorney, Agent, or Firm—Kenyon & Kenyon

[57] ABSTRACT

An apparatus for transferring articles, such as eggs, from one station to another. The eggs are arranged in a predetermined configuration at the first or transfer station, and deposited at a second station in a different array or configuration. The transfer head, which contains egg engaging and lifting members in the form of vacuum cups, includes a first and second carrier section, each of which retains one-half of the array or egg engaging positions. The carrier sections are interconnected by linkage members which, when rotated, change the array configuration from a first position to a second position without the need for rotating the entire transfer head and the articles being carried.

10 Claims, 5 Drawing Figures

EGG TRANSFER HEAD

BACKGROUND OF THE INVENTION

This invention relates generally to article transfer systems, and more particularly, to a system having a transfer head with a plurality of article holders which may be advantageously configured to conform to a selectable one of alternative array arrangements.

It is often desirable in production systems to move a group of spaced articles from one location to another. Such articles may include eggs, which are desired to be moved as a group. For example, eggs are generally provided on transport flat trays which are configured with recesses wherein the eggs are placed in an array arrangement. The egg trays may be delivered by a conveyor or other transport means to a location at which it is desired to remove the eggs from the flat trays as a group so that the group may be transported to another location, which may be a further conveyor system, illustratively for washing or the like.

The transport mechanism may be comprised of a transfer head which contains a plurality of known vacuum cups which are arranged in the transfer head so as to conform to the array arrangement of the eggs in the transport trays. Once a tray has been placed and aligned under the transfer head, the transfer head will descend over the eggs until the vacuum cups engage with respectively associated eggs. Once the eggs have been engaged by the transfer head by means of the vacuum cups, the head and eggs may be lifted and moved, illustratively by a mechanical lifting arm, to a further location where it is desired to deposit the eggs for further processing.

In certain known egg transfer systems, egg trays are removed from alternatingly rotated stacks, loaded onto a conveyor system for processing, and restacked. Every second one of the egg trays is rotated by 90° as they are lifted from the original stack and loaded into the conveyor. After processing, the egg trays are lifted from the conveyor, every second one being rotated by 90° so as to restack the egg trays in the alternatingly rotated configuration. It is a problem with the known systems of this type that, during the rapid operation of the machine, the egg trays are rotated very quickly. Thus, such a rotative system cannot be used at high production rates in arrangements where the individual eggs are lifted from a tray as a group by respectively associated vacuum cups, because the centrifugal force created by the rapid rotation causes some of the eggs to be released. In addition, such head rotation creates design problems as a result of the space required to achieve rotation.

Although the prior art has provided systems for adjusting the inter-article spacing of the articles in a transfer head or at the location of deposition, the known systems have not solved the problems associated with picking up a plurality of articles which are arranged in a first array configuration, and depositing them at a further location, or at the same location, in a second array arrangement, in a simple and effective manner. For example, in the case of egg transfer systems which utilize vacuum cups, eggs are collected at a collection location, in an array arrangement having illustratively 6 rows by 5 columns. It may subsequently be desired to deposit the eggs at a deposition location in an array arrangement having 5 rows by 6 columns. In some article transfer systems which are limited in space, it is neither feasible nor desirable to rotate the transfer head 90° to achieve the new array configuration. Such rotation of the transfer head, as noted above, creates mechanical design problems as a result of; the complex mechanisms which are required for transmitting rotational motion to the transfer head; the control of such motion to achieve the desired alignment accuracy; and the need for a strong vacuum supply for holding the eggs in the vacuum cups if the transfer head is to be rotated quickly and stopped in a short time.

It is, therefore, an object of this invention to provide a simple and inexpensive transfer head arrangement which can convert a first article array arrangement into a second array arrangement.

SUMMARY OF THE INVENTION

The foregoing and other objects are achieved by this invention which provides a transfer head which is provided with two article holder carriers, each of which retains one half of the article holders in fixed positions in a transfer head. The two article holder carriers are advantageously connected to one another by mechanical linkage which permits the carriers to rotate about one another in a manner which converts an m by n article holder array configuration into an n by m array configuration.

In one specific illustrative embodiment of the invention, one half of the article holders are on each of the two carriers so that each carrier has a complementary mirror image arrangement of article holders with respect to the other carrier. In an embodiment wherein m and n differ by one, such as in a 5 by 6 array arrangement, the linkage arrangement may comprise at least two linkage straps, each pivotally interconnecting adjacent ones of the article holder positions, each of such adjacent positions being on a respective one of the carriers. Thus, the linkage straps serve to interconnect the two carriers so that they may rotate about one another in an articulated manner. The array configuration is changed by rotating the linkage straps by 90°. Thus, the illustrative 5 by 6 array, which has the linkage straps oriented so as to be parallel to the vertical direction, will be transformed into a 6 by 5 array arrangement, which has the linkage straps oriented so as to be parallel with the horizontal direction.

Such a transformation of a generalized m by n array can be achieved with arrays which conform at least to the following rules:

the value of either m or n must not be 0;

the absolute value /m-n/ must be an integer which is greater than 0 but less than either m or n; and the product mn must be an even integer.

It should be noted that these mathematical rules apply to array configurations wherein each array position corresponds to either the location of one article holder, or a subgroup of article holders. For example, a 6×9 array may be considered as a 2×3 array wherein each matrix position corresponds to a subgroup of 9 article holders. The carrier connecting points on the linkage straps are separated by a length equal to the absolute difference between m and n, multiplied by the distance between each article holder. Accordingly, if the absolute difference between m and n is 1, the distance between the carrier connecting points on the linkage straps will be as long as the distance between adjacent article holders. In an illustrative 6×9 array configuration, the absolute difference between m and n is 3, thereby requiring the distance between the pivot connections on the linkage straps to be at least three times as long as the distance between adjacent article holders.

It is a feature of this invention that an array arrangement of article holders in a transfer head may be orthogonally reconfigured, without rotating the transfer head.

It is a further feature of this invention that alignment precision may be achieved simply by fixing the position of one of the carriers with respect to the transfer head, and limiting the angular rotation of the linkage straps to precisely 90°.

It is another feature of this invention that orthogonal array transformation may be achieved in a limited space by the obviation of transfer head rotation.

It is still a further feature of this invention that the array transformation may be achieved without unduly accelerating the articles, as would be required in a rotating transfer head arrangement.

BRIEF DESCRIPTION OF THE DRAWINGS

Comprehension of the invention is facilitated by reading the following detailed description in conjunction with the annexed drawings in which.

DETAILED DESCRIPTION

Figure 1:
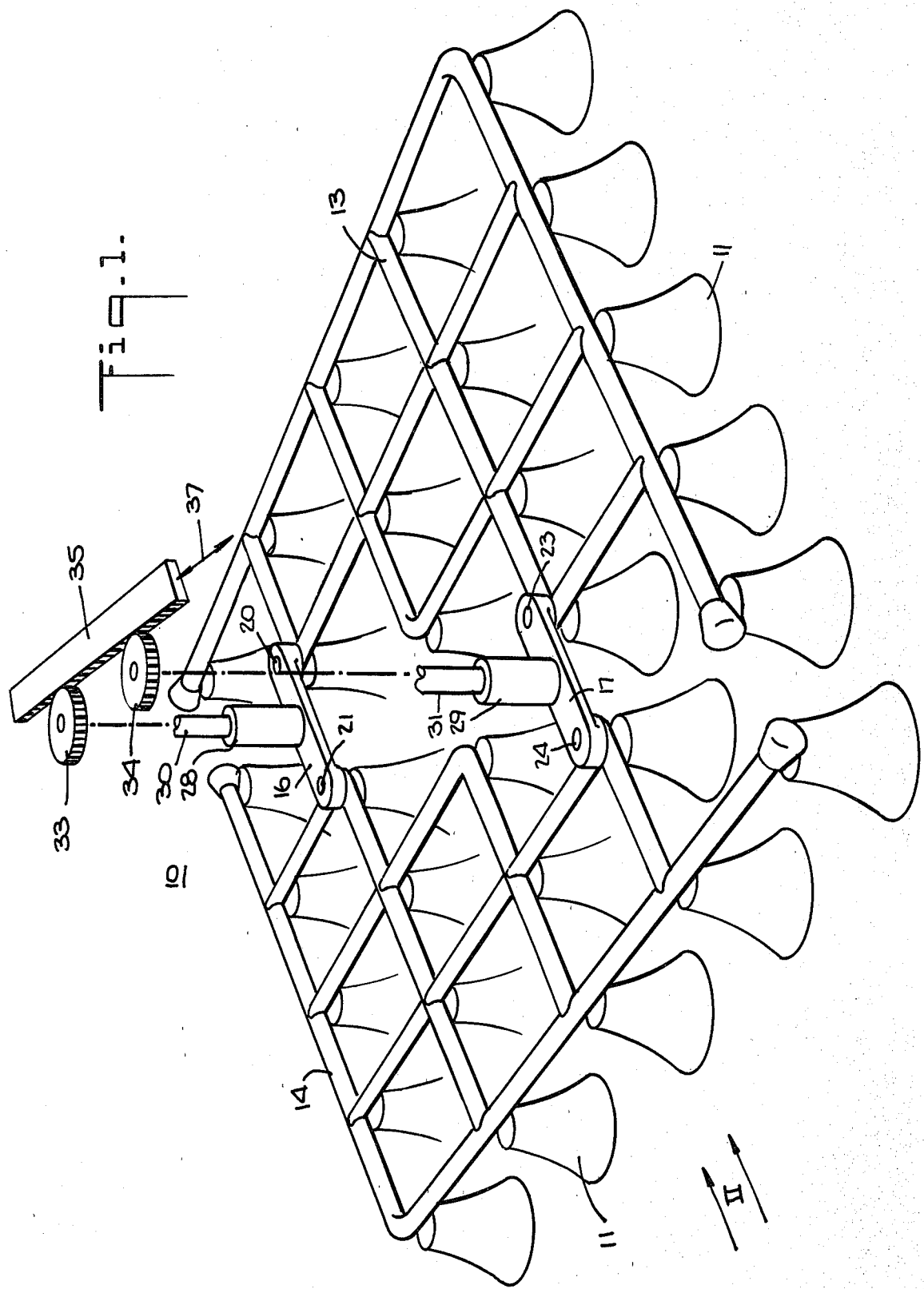
FIG. 1 is a simplified perspective view of an illustrative transfer head embodiment having 30 article holders in the form of vacuum cups which are shown to be arranged in an array configuration having 5 columns and 6 rows.

FIG. 1 shows a perspective view of an arrangement of article holders 11 in a transfer head which is generally designated as 10. In this embodiment, article holders 11 are vacuum cups of the type used for engaging eggs, and are arranged in an array arrangement having 6 columns by 5 rows. Fifteen of the thirty article holders are retained in position by a holder carrier 13, which is shown in the drawing to be formed of tubular members for conducting a vacuum to the article holders. The remaining fifteen article holders are retained in position by a second holder carrier 14, which is constructed similar to holder carrier 13.

In this embodiment, holder carriers 13 and 14 are mechanically coupled to one another by linkage straps 16 and 17. Linkage strap 16 is pivotally connected to each of carriers 13 and 14, at pivot connections 20 and 21, respectively. Similarly, linkage strap 17 is connected to carrier 13 at pivot 23, and to carrier 14 at pivot 24.

Linkage straps 16 and 17 are provided with respective shaft couplers 28 and 29 for mechanically connecting the linkage straps to shafts 30 and 31. Shafts 30 and 31 are connected to respective pinion gears 33 and 34 which are meshed with a rack gear 35. Thus, as rack gear 35 is axially moved in the direction of arrows 37, pinion gears 33 and 34 are rotated, causing linkage straps 16 and 17 to be rotated 90°, so as to cause a rearrangement of the array configuration, in a manner which will be described hereinbelow.

Figure 2:
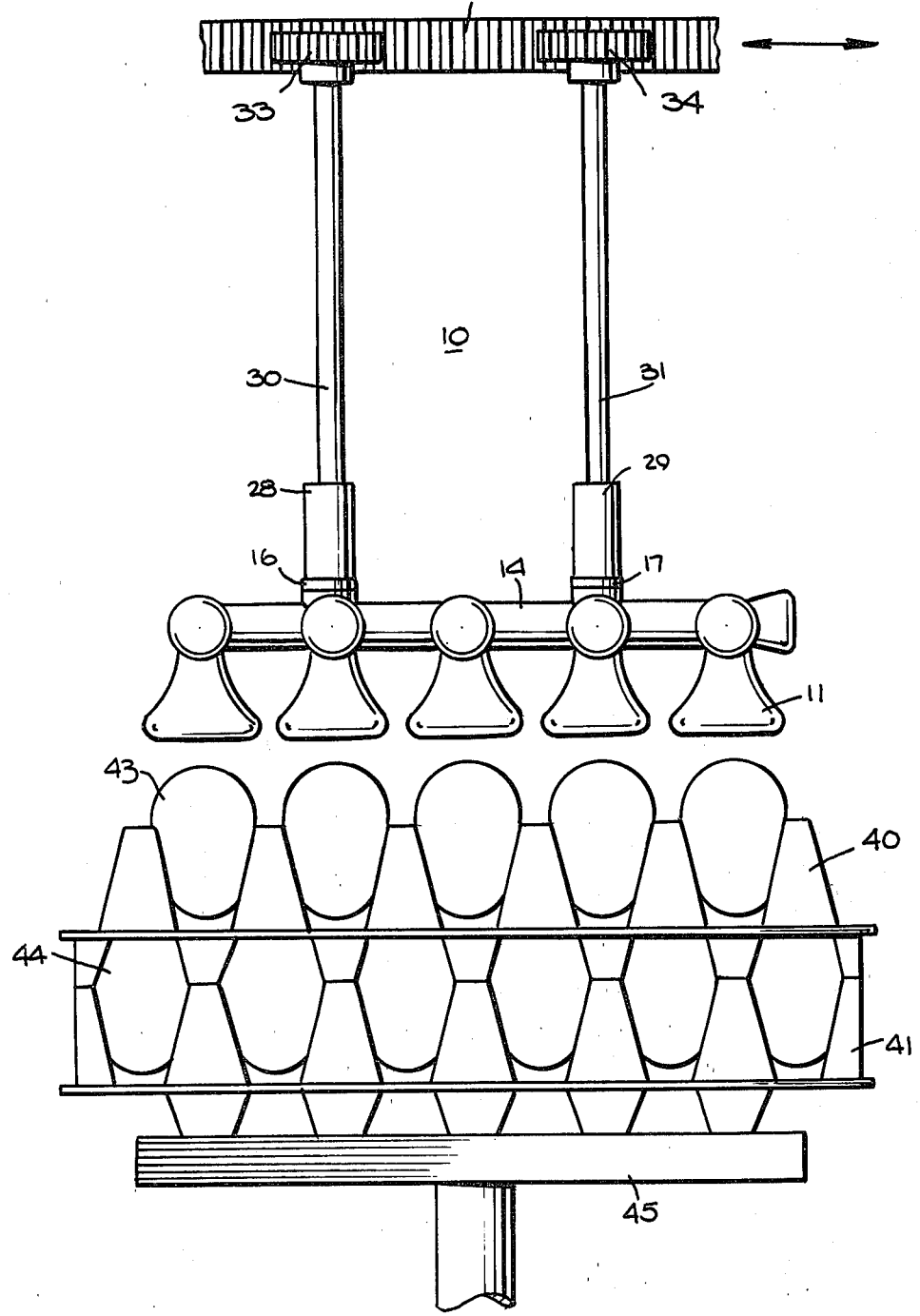
FIG. 2 shows a side elevation view of the transfer head embodiment of FIG. 1 in the proximity of an egg tray holding an array of eggs.

FIG. 2 is a side elevation view of transfer head 10 in FIG. 1, as viewed from the direction indicated by arrows II in FIG. 1. FIG. 2 further shows egg trays 40 and 41 containing eggs 43 and 44, respectively. Egg trays 40 and 41 each contain, in this embodiment, 30 eggs which are arranged in 5 by 6 array configurations, the egg trays being rotated 90° with respect to one another. Thus, egg tray 40, in this side elevation view, shows 5 eggs, whereas egg tray 41 shows 6 eggs. The egg trays are supported on a support base 45.

As shown in FIG. 2, transfer head 10 is disposed immediately above egg tray 40 so that vacuum cups 11 will engage eggs 43, as the transfer head is lowered. After vacuum cups 11 are engaged with and lift eggs 43 from egg tray 40, egg tray 40 is removed while eggs 43 are being unloaded at a deposition location (not shown). When transfer head 10 returns to the position shown in FIG. 2, vacuum cups 11 will be in the proper position over eggs 44 of egg tray 41. Thereafter, rack gear 35 is moved during the transfer step so that linkage straps 16 and 17 are rotated by 90°, thereby reconfiguring the array arrangement of article holders 11. Such an array transformation is achieved in accordance with the sequence described with respect to FIGS. 3, 4 and 5, below.

Figure 3:
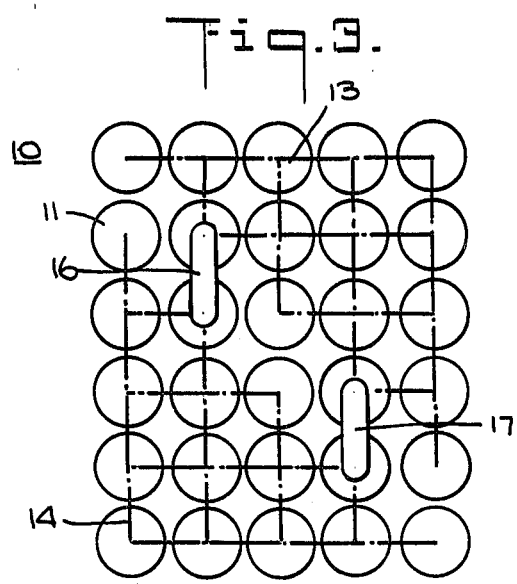
FIG. 3 is a simplified schematic representation of a plan view of the inventive transfer head in an array configuration having 5 columns and 6 rows.

FIG. 3 shows a simplified schematic plan view of the arrangement of article holders 11 in FIG. 1. As shown in FIG. 3, article holders 11 are arranged in an array configuration having 5 columns and 6 rows. Thus, linkage straps 16 and 17 are arranged parallel to the columns. For the sake of clarity of the drawing, shaft couplers 28 and 29, shafts 30 and 31, pinion gears 33 and 34, and rack gear 35, are not shown.

Figure 4:
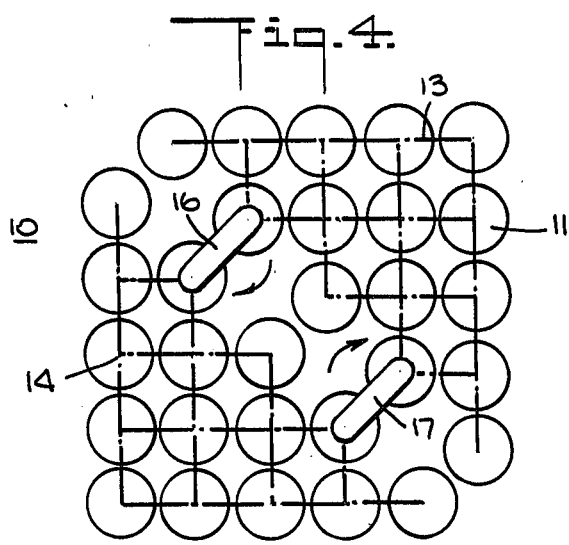
FIG. 4 is a simplified plan view of the embodiment of FIG. 3, in the process of being transferred.

FIG. 4 shows carriers 13 and 14 in the process of being displaced with respect to one another by the rotation of linkage straps 16 and 17. The linkage straps have been rotated approximately 45° in a clockwise direction, as shown by the curved arrows in the drawing.

Figure 5:
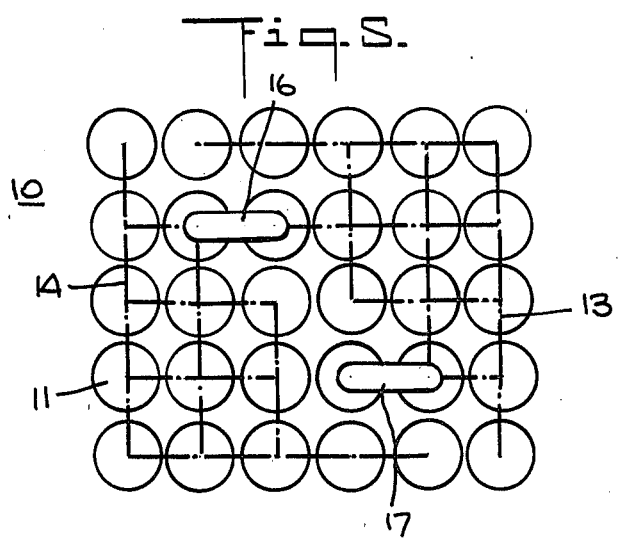
FIG. 5 shows the transfer head of FIG. 3 which has been transferred into an array configuration having 6 columns and 5 rows.

FIG. 5 shows linkage straps 16 and 17 arranged parallel to the rows after having completed 90° of rotation in the direction shown by the curved arrows in FIG. 4. FIG. 5 shows that rotation of the carrier straps by 90° has produced reorientation of the carriers and the article holders which are retained thereby, so as to produce an array configuration having 6 columns and 5 rows. Thus, the array configuration of FIG. 1 has been orthogonally transformed without rotation of the transfer head. Moreover, the transformation is achieved without unduly accelerating the articles contained in article holders 11.

When transferring eggs from a stack of alternately arranged egg trays, e.g., 40 and 41, disposed on support base 45 to another location, the change in the configuration of the array of eggs is readily facilitated during the transfer step. Thus, the change in the configuration, e.g., from that of FIG. 3 to that of FIG. 5, is accomplished during the transfer step with the eggs being carried in vacuum cups 11. While the transfer head is being returned to engage the next alternately aranged egg tray disposed on the support base 45, the head configuration remains unchanged. In this manner the vacuum cups are appropriately arranged to engage the eggs in the next tray which is stacked with a 90° shift in orientation. Transfer of the eggs is then accomplished in the manner previously described.

It should be noted that embodiments of the invention may be devised wherein the positions of the article holders are each representative of a subarray of holders, instead of the single holder described in the illustrative embodiment. Such an arrangement of subarrays would facilitate embodiments wherein there are many article holders to be configured into selectable array configurations as described hereinabove. Thus, although the inventive concept disclosed herein has been described in terms of a specific embodiment and particular applications, persons skilled in the pertinent art can generate additional embodiments without departing from the spirit or exceeding the scope of the invention. The drawings and description of the specific embodiment in this disclosure are merely illustrative of the invention and should not be construed to limit the scope thereof.

What is claimed is:

1. A transfer system having a transfer head for transporting a predetermined plurality of articles which are disposed in a first array configuration having m columns by n rows at a first station, to a second station, the predetermined plurality of articles being reconfigured from the first array configuration to a second array configuration having n columns by m rows so as to be deposited at the second station in the second array configuration, the transfer head being provided with a predetermined plurality of article holders for engaging respective ones of the predetermined plurality of articles during transportation, the transfer system further comprising:

first and second article holder carrier means, each said article holder carrier means being arranged to retain one-half of the predetermined plurality of article holders in positions corresponding to the first array configuration; and linkage means connected to each of said first and second article carrier means to permit said first and second article carrier means to be moved with respect to one another, said linkage means being rotated by approximately 90° so as to change said arrangement of the article holders from the first array configuration to the second array configuration.

2. The article transfer system of claim 1 wherein said linkage means comprises first and second linkage members, each having first and second pivots for pivotally connecting to said first and second article holder carrier means, respectively.

3. The article transfer system of claim 2 wherein the first and second array configurations have an equal interarticle distance, a distance between said first and second pivots of each of said first and second linkage members being equal to said interarticle distance.

4. An apparatus for transferring a plurality of eggs from the uppermost tray of multiple stacked trays, alternate trays having different orientations, from a pick-up station to an unloading station, the apparatus comprising a transfer head including means thereon for engaging the eggs to be transferred from said uppermost tray, means for pivotally moving said transfer head from said pick-up station to said unloading station, the egg engaging means including vacuum cups adapted to engage and hold the eggs to be transferred, said vacuum cups being arranged in rows parallel and perpendicular to one another to form a first rectangular configuration with the parallel rows including a like number of vacuum cups, and those rows perpendicular thereto having a different number of vacuum engaging cups, said transfer head including thereon a pair of oppositely disposed carrier frames of the same general configuration for supporting said egg engaging cups, each of said carrier frames being adapted to support one-half of the eggs to be transferred, said carrier frames having linkage means for connecting said pair of oppositely disposed carrier frames to one another and means attached to said linkage means to rotate said linkage means and thereby move said oppositely disposed carrier frames with respect to one another to change the orientation of said carrier frames while being transferred from said pick-up station to said unloading station, whereby the changed orientation of said carrier frames produces a second rectangular configuration of parallel rows having an equal number of vacuum cups to said first rectangular configuration.

5. The apparatus of claim 4 wherein each of said multiple stacked trays contain 30 eggs arranged in a 6 by 5 rectangular configuration.

6. A method for transferring a plurality of eggs from a tray disposed at a pick-up station, said tray having 30 eggs arranged therein in a 6 column by 5 row rectangular configuration, the method comprising the steps of:

engaging the 30 eggs in respectively associated vacuum cups;

transferring said vacuum cups and eggs engaged therewith in a transfer head having two carrier portions, each carrier portion supporting one-half of said vacuum cups and eggs engaged therewith, in the 6 column by 5 row rectangular configuration;

changing the orientation of the carrier portions with respect to one another during said transferring step so as to arrange said vacuum cups and eggs engaged therewith in a 5 column by 6 row rectangular configuration; and depositing said eggs in said 5 column by 6 row rectangular configuration at an unloading station.

7. An article transfer system for simultaneously transporting a plurality of articles which are arranged in a planar array of m columns by n rows having mn array positions, where $m \neq n$; $(m,n) > 1$; $/m-n/=p$, where p is an integer and $0 < p < (m,n)$; and $mn/2 = q$, where q is an integer, the article transfer system having a transfer head for collecting the articles at a pick-up location while the articles are arranged in the m column by n row array configuration, and depositing the articles at an unloading location in an n column by m row array configuration, the article transfer system further comprising:

a plurality of article holder means in the transfer head, each for holding a respective article during transportation;

first and second article holder carrier means, each said article holder carrier means being arranged to retain q ones of said article holder means in positions corresponding to said respective articles; and linkage means for connecting said first and second article carrier means to one another so as to permit said first and second article carrier means to be rotated with respect to one another, and thereby change said arrangement of said article holder carrier means from the m column by n row array configuration to the n column by m row array configuration.

8. The article transfer system of claim 7 wherein said linkage means comprises first and second linkage straps, each having first and second pivots for pivotally connecting to said first and second article holder carrier means, respectively.

9. The article transfer system of claim 8 wherein said first and second pivots on said linkage straps are separated from each other by p times a distance between adjacent array positions in the transfer head.

10. The article transfer system of claim 8 wherein a subarray of article holders is arranged at each array position, each subarray of article holders being arranged in a y by y, square subarray configuration, said first and second pivots on said linkage straps being disposed at least py times the distance between array positions.

* * * * *